United States Patent
Chou (10) Patent No.: US 12,467,840 B2
(45) Date of Patent: Nov. 11, 2025

(54) RECIPROCATING FRICTION AND WEAR TEST APPARATUS

(71) Applicant: National Taiwan Ocean University, Keelung (TW)

(72) Inventor: Chau-Chang Chou, New Taipei (TW)

(73) Assignee: NATIONAL TAIWAN OCEAN UNIVERSITY, Keelung (TW)

( * ) Notice: Subject to any disclaimer, the term of this patent is extended or adjusted under 35 U.S.C. 154(b) by 250 days.

(21) Appl. No.: 18/168,505

(22) Filed: Feb. 13, 2023

(65) Prior Publication Data

US 2024/0151619 A1    May 9, 2024

(30) Foreign Application Priority Data

Nov. 4, 2022    (TW) .................................. 111142172

(51) Int. Cl.
*G01N 3/56*        (2006.01)
*G01L 1/16*        (2006.01)

(52) U.S. Cl.
CPC . *G01N 3/56* (2013.01); *G01L 1/16* (2013.01)

(58) Field of Classification Search
CPC ... G01N 2203/0206; G01N 2203/0494; G01N 2203/0058; G01N 3/46; G01N 3/58; G01N 3/565; G01N 3/56; G01N 17/006; G01N 19/06; G01M 99/007
USPC ...................................................... 73/105, 7
See application file for complete search history.

(56) References Cited

U.S. PATENT DOCUMENTS

| | | | | |
|---|---|---|---|---|
| 4,606,225 A * | 8/1986 | Thomason | ............. | G01N 19/04 73/827 |
| 5,545,081 A * | 8/1996 | Haffely | ..................... | B24B 3/36 451/367 |
| 5,546,797 A * | 8/1996 | Dutta | ..................... | G01N 19/04 73/866 |
| 6,167,745 B1 * | 1/2001 | Hamer | .................. | G01N 19/02 73/9 |
| 6,418,776 B1 * | 7/2002 | Gitis | ..................... | G01N 19/02 73/9 |
| 7,013,706 B2 * | 3/2006 | Tarumi | ................. | G01N 29/348 73/9 |
| 7,293,448 B2 * | 11/2007 | Treece | ..................... | G01N 3/56 451/5 |
| 7,302,831 B2 * | 12/2007 | Moyse | .................. | G01N 19/02 73/81 |
| 7,387,015 B2 * | 6/2008 | Chancellor | .............. | G01N 3/50 73/85 |

(Continued)

*Primary Examiner* — Tran M. Tran
(74) *Attorney, Agent, or Firm* — HSML P.C.

(57) ABSTRACT

A reciprocating friction and wear test apparatus includes a frame unit and an abrader unit. The frame unit includes a frame that has a bottom wall formed with an opening and two side walls extending upwardly from the bottom wall. The abrader unit includes an abrader fixture, an abrader, two first sensor members, and two adjustment members. The abrader fixture extends through the opening and is pivotable relative to the bottom wall. The abrader is affixed to the abrader fixture. The two first sensor members are respectively mounted to the side walls. The two adjustment members are respectively connected to the first sensor members, extend respectively through the first sensor members, extend respectively through the side walls, and are movable toward the abrader fixture to tightly abut against the abrader fixture.

7 Claims, 11 Drawing Sheets

(56) References Cited

U.S. PATENT DOCUMENTS

| | | | | |
|---|---|---|---|---|
| 7,685,869 | B2* | 3/2010 | Bonilla | G01Q 60/366 73/105 |
| 7,884,929 | B2* | 2/2011 | Suzuki | G01N 3/58 356/237.1 |
| 8,375,774 | B2* | 2/2013 | Seok | G01N 3/46 73/81 |
| 8,549,891 | B2* | 10/2013 | Ryan | G01N 3/56 73/7 |
| 9,046,456 | B2* | 6/2015 | Furuta | G01N 3/42 |
| 9,366,610 | B2* | 6/2016 | Zhang | G01N 3/42 |
| 9,752,969 | B2* | 9/2017 | Werner | G01N 3/56 |
| 9,778,158 | B2* | 10/2017 | Bellemare | G01N 3/46 |
| 10,132,733 | B2* | 11/2018 | Vinogradov-Nurenberg | G01N 3/56 |
| 10,215,675 | B2* | 2/2019 | Khosla | G01N 3/56 |
| 11,313,777 | B2* | 4/2022 | Ramirez Gonzalez | F16C 17/246 |
| 11,346,857 | B1* | 5/2022 | Daugela | G01N 29/46 |
| 11,428,625 | B2* | 8/2022 | Zhang | G01N 3/56 |
| 11,579,056 | B2* | 2/2023 | Char | G01N 3/04 |
| 11,768,149 | B2* | 9/2023 | Zhang | G01N 33/30 73/10 |
| 11,808,738 | B2* | 11/2023 | Lemmer | G01N 3/04 |
| 11,867,666 | B2* | 1/2024 | Fischer | G01N 3/46 |
| 11,982,650 | B2* | 5/2024 | Xu | G01N 19/02 |
| 12,038,415 | B2* | 7/2024 | Wolff | G01L 5/0038 |
| 2005/0120774 | A1* | 6/2005 | Shinohara | G01N 3/56 73/7 |
| 2005/0172702 | A1* | 8/2005 | Gitis | G01N 3/56 73/150 R |
| 2015/0260624 | A1* | 9/2015 | McMahon | G01N 3/42 403/56 |
| 2016/0290797 | A1* | 10/2016 | Bos | G01B 21/04 |
| 2022/0397503 | A1* | 12/2022 | Tyagi | G01N 3/46 |
| 2023/0366796 | A1* | 11/2023 | Guo | G01N 3/56 |

* cited by examiner

RECIPROCATING FRICTION AND WEAR TEST APPARATUS

CROSS-REFERENCE TO RELATED APPLICATION

This application claims priority to Taiwanese Invention Patent Application No. 111142172, filed on Nov. 4, 2022.

FIELD

The disclosure relates to a wear test apparatus, and more particularly to a reciprocating friction and wear test apparatus.

BACKGROUND

A conventional reciprocating wear test system is adapted for performing a wear test on a specimen. The wear test system has a sample holder and a force sensor connected to the sample holder. The sample holder is used to hold a wear sample for abrading the specimen, and the force sensor is used to measure frictional forces between the wear sample and the specimen. During testing, the locations of the sample holder and the force sensor need to be fixed relative to each other to ensure correctness of the measured data. However, there is generally some backlash between the sample holder and the force sensor due to insufficient assembly tolerance or preload, resulting in relative movement between the sample holder and the force sensor during testing, which reduces the accuracy of the friction force measurements. In particular, the above phenomenon is even more pronounced when the sample holder is changing movement direction. Therefore, there is still room for improvement of the conventional reciprocating wear test system.

SUMMARY

Therefore, an object of the disclosure is to provide a reciprocating friction and wear test apparatus that can alleviate at least one of the drawbacks of the prior art.

According to the disclosure, the reciprocating friction and wear test apparatus includes a frame unit, and an abrader unit. The frame unit includes a frame that has a bottom wall formed with an opening and two side walls extending upwardly from the bottom wall. The abrader unit includes an abrader fixture, an abrader, two first sensor members, and two adjustment members. The abrader fixture extends through the opening and is pivotable relative to the bottom wall. The abrader is affixed to the abrader fixture. The two first sensor members are respectively mounted to the side walls. The two adjustment members are respectively connected to the first sensor members, extend respectively through the first sensor members, extend respectively through the side walls, and are movable toward the abrader fixture to tightly abut against the abrader fixture.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
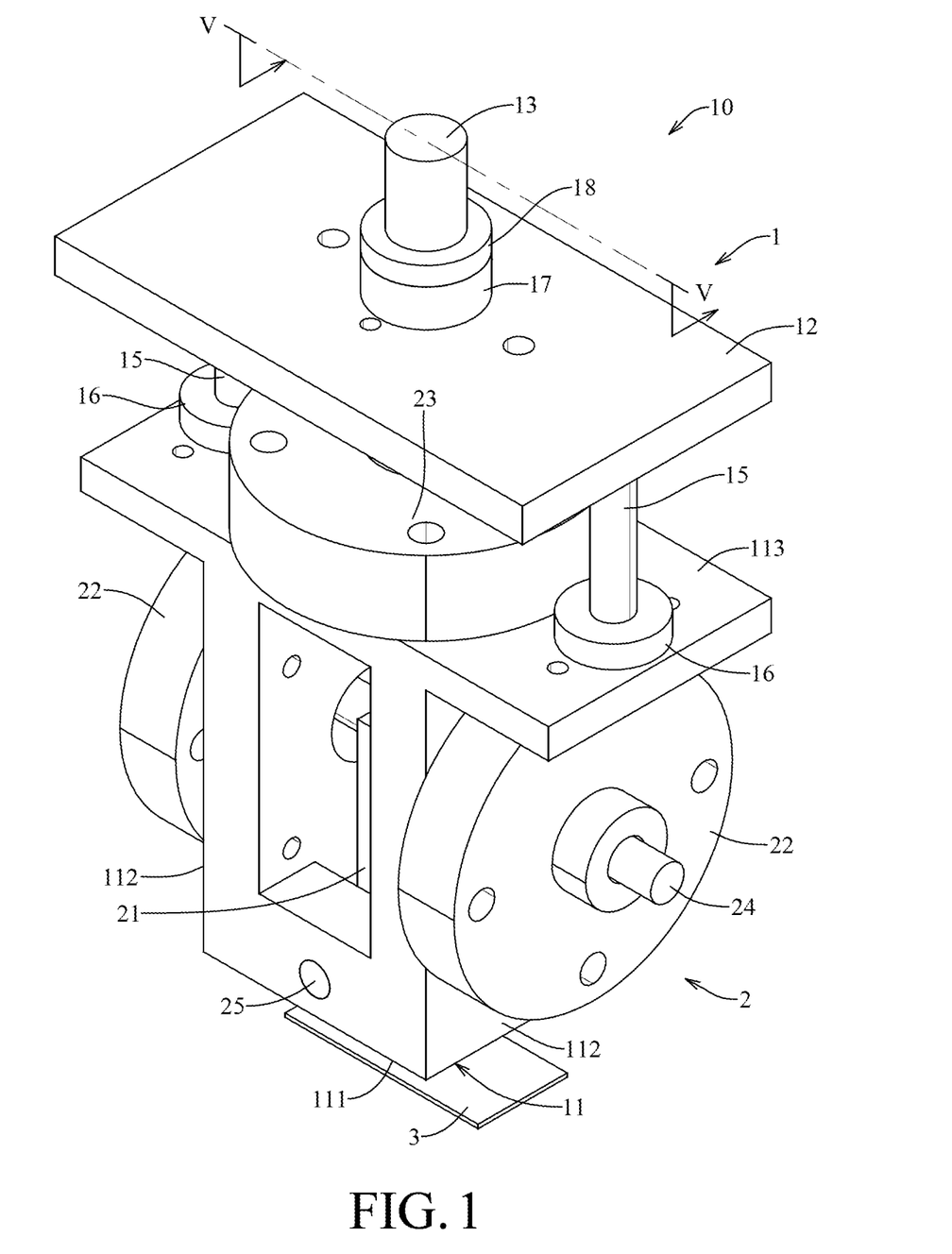
FIG. 1 is a perspective view illustrating a first embodiment of a reciprocating friction and wear test apparatus according to the present disclosure, and a specimen.
Figure 2:
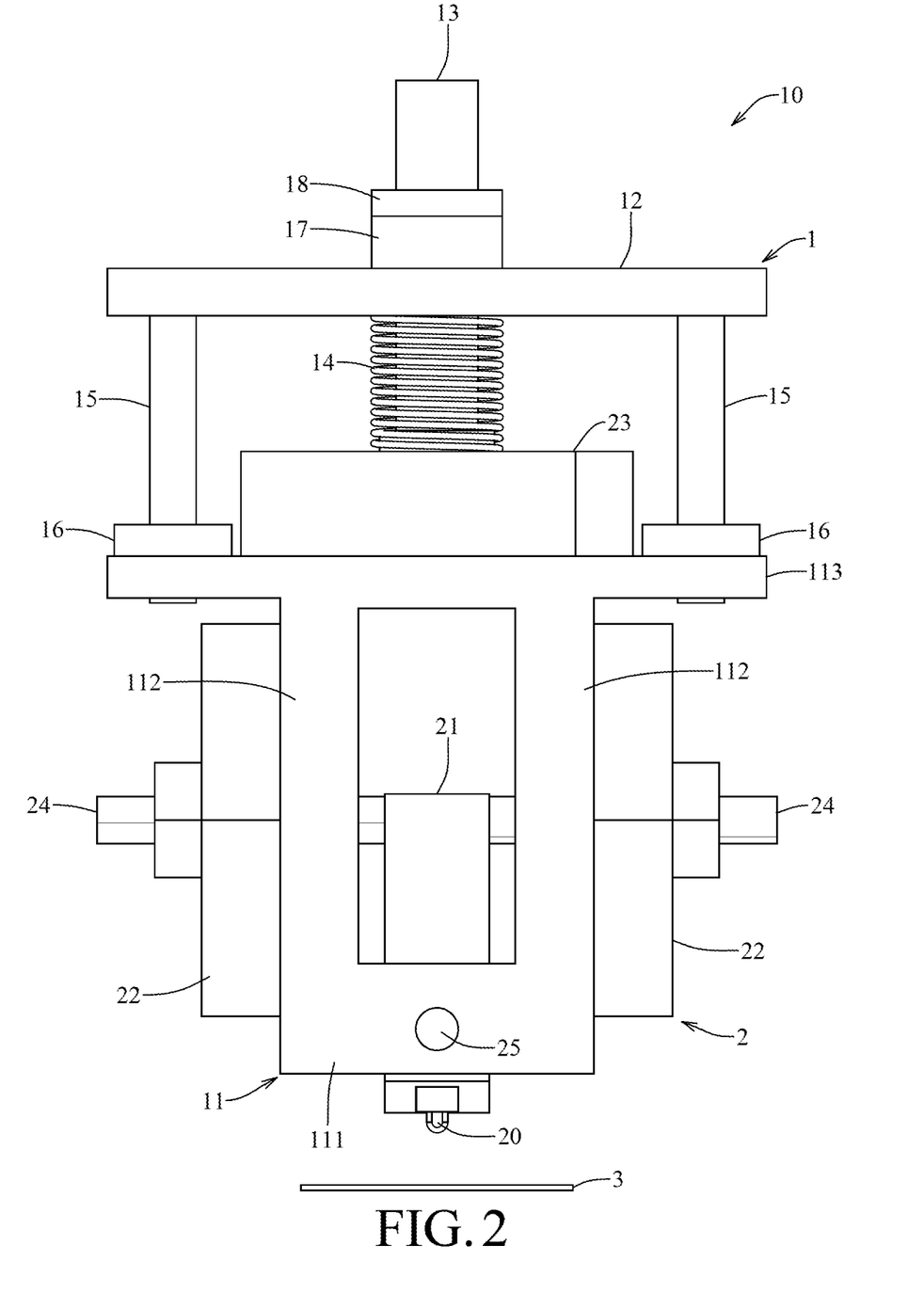
FIG. 2 is a front view illustration the first embodiment and the specimen.
Figure 3:
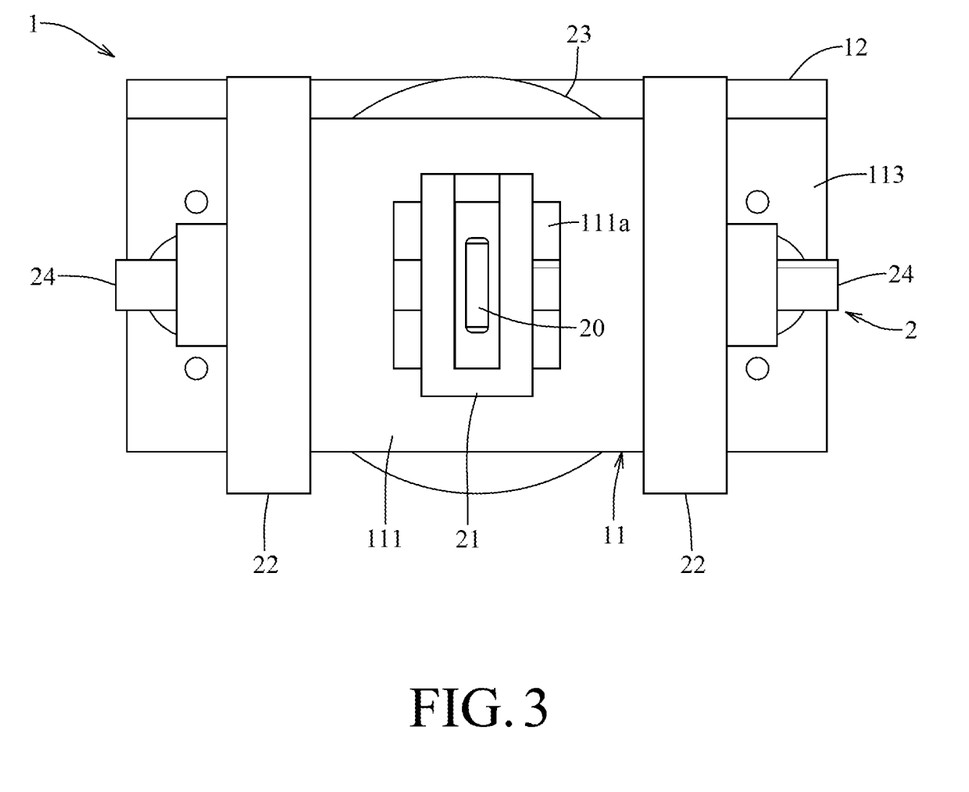
FIG. 3 is bottom view of the first embodiment.

Referring to FIGS. 1 to 3, a first embodiment of a reciprocating friction and wear test apparatus 10 according to the present disclosure is adapted to be disposed on a test machine (not shown) and to perform wear testing on a specimen 3. The reciprocating friction and wear test apparatus 10 includes a frame unit 1 and an abrader unit 2.

Figure 4:
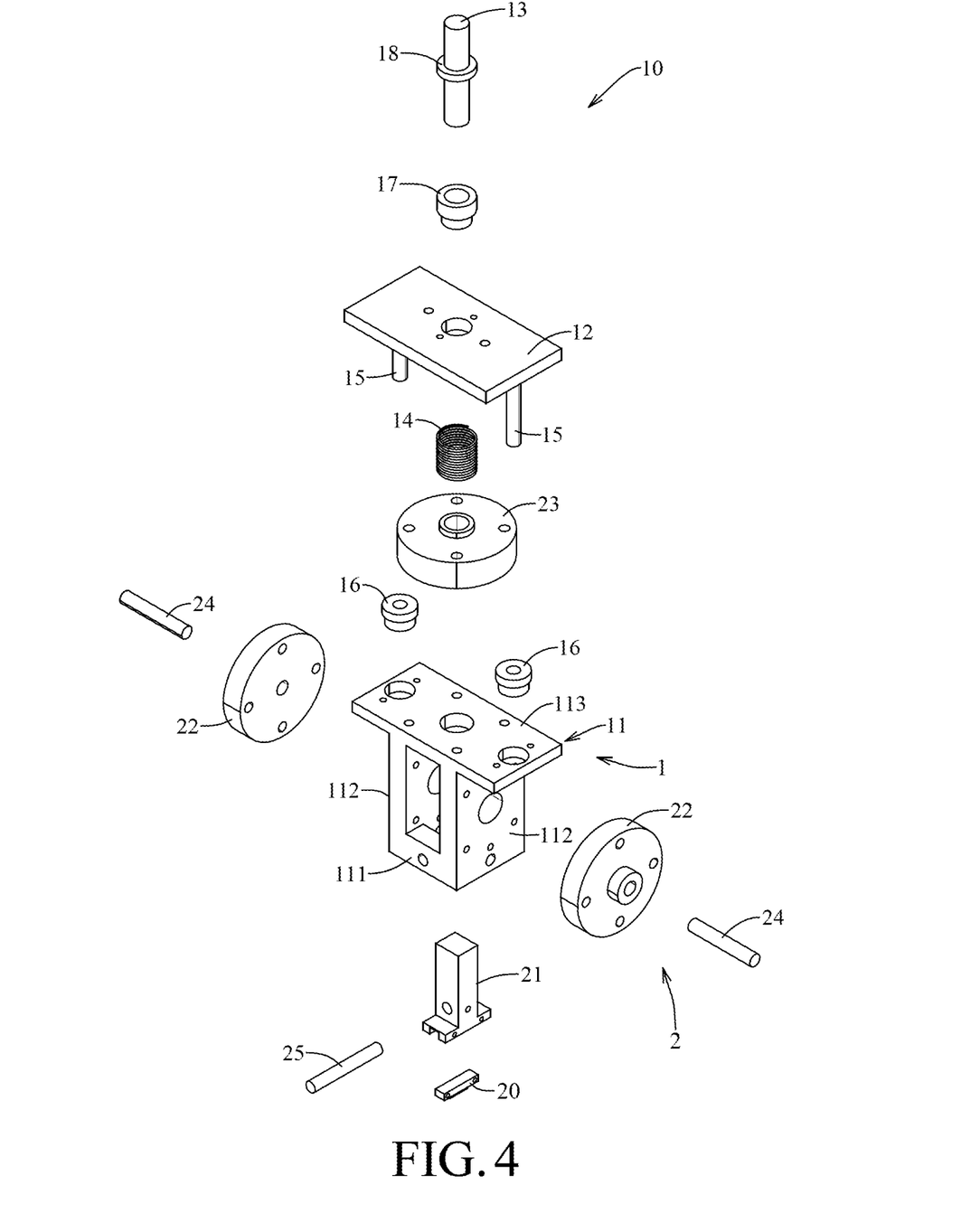
FIG. 4 is an exploded perspective view of the first embodiment.
Figure 5:
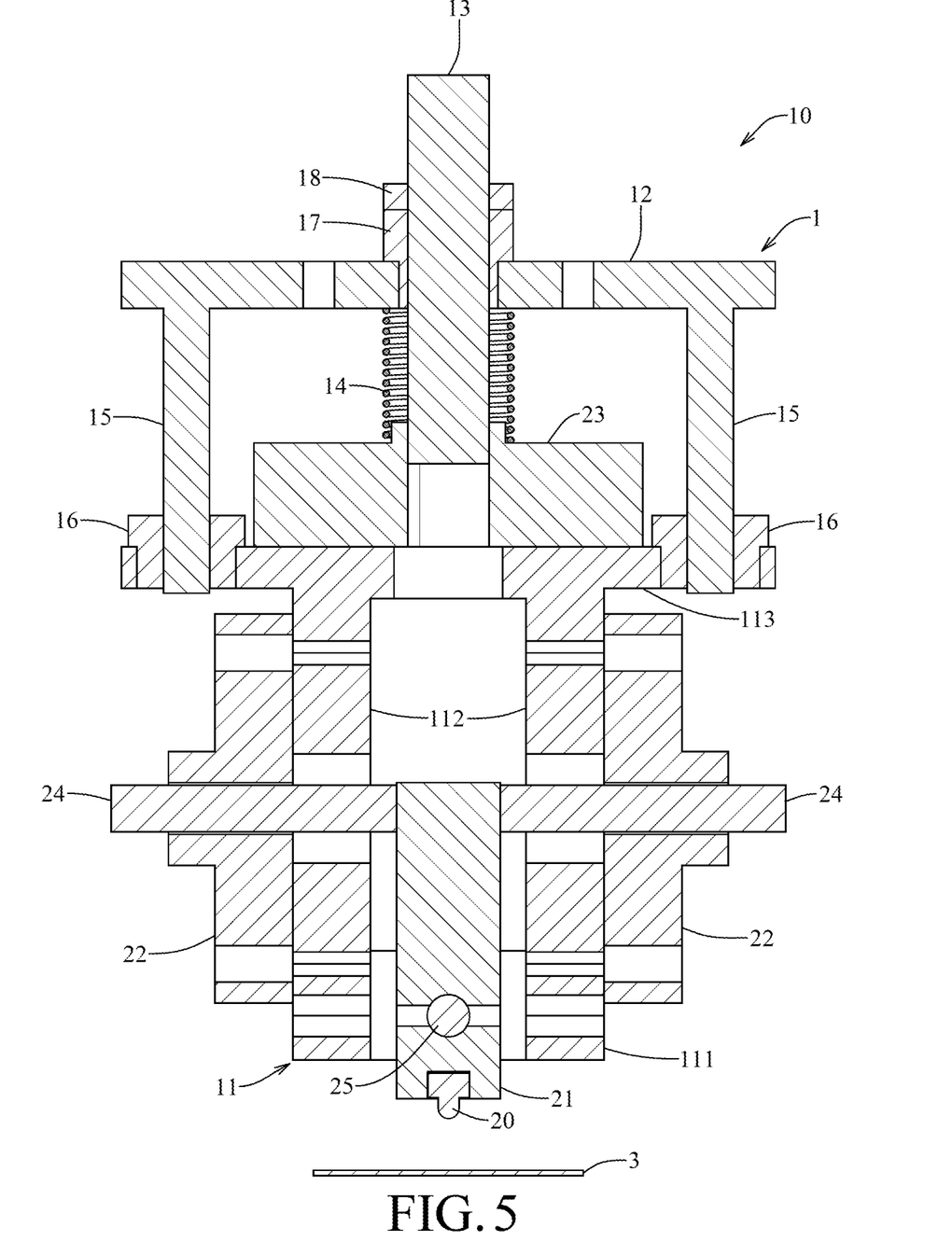
FIG. 5 is a cross-sectional view taken along line V-V in FIG. 1.

Referring to FIGS. 3 to 5, the frame unit 1 includes a frame 11, a base plate 12, a guide post 13, a resilient member 14, two guiding rods 15, two side bearings 16, an upper bearing 17, and a securing ring 18. The base plate 12 is connected to the frame 11 and is adapted to be fixed to the test machine. The guide post 13 movably extends through the base plate 12, and extends through the upper bearing 17. The resilient member 14 is sleeved on the guide post 13. The two guiding rods 15 are immovably connected to the base plate 12. The two side bearings 16 are respectively sleeved on the two guiding rods 15. The upper bearing 17 is mounted on the base plate 12. The securing ring 18 is co-movably sleeved on the guide post 13 and abutting removably against the upper bearing 17. The frame 11 has a bottom wall 111, two side walls 112 extending upwardly from the bottom wall 111, and a top wall 113 that is connected to distal ends of the side walls 112 opposite to the bottom wall 111. The bottom wall 111 is formed with an opening 111a. The two side bearings 16 are mounted on the top wall 113, and the two guiding rods 15 respectively extend through the two side bearings 16 (i.e., extend through the top wall 113 of the frame 11). The frame 11 is configured to move in a reciprocating motion relative to the base plate 12. More specifically, the frame 11 is movable in a reciprocal motion along the guiding rods 15 relative to the base plate 12.

The abrader unit 2 includes an abrader 20, an abrader fixture 21, two first sensor members 22, a second sensor member 23, and two adjustment members 24. The abrader 20 is affixed to the abrader fixture 21. The abrader fixture 21 extends through the opening 111a and is pivotable relative to the bottom wall 111. The two first sensor members 22 are respectively mounted to the side walls 112. The second sensor member 23 is mounted between the base plate 12 and the frame 11, and is immovably mounted on the top wall 113 of the frame 11. The two adjustment members 24 are respectively connected to the first sensor members 22, extend respectively through the first sensor members 22, and extend respectively through the side walls 112. More specifically, the guide post 13 has an end that is threadedly connected to the second sensor member 23, and the resilient member 14 has two opposite ends respectively abutting against the base plate 12 and the second sensor member 23. The resilient member 14 is lightly compressed to preload the second sensor member 23. The upper bearing 17 supports the securing ring 18 which connects the second sensor member 23, the frame, the first support member 22, the abrader fixture 21, and the abrader 20. The abrader fixture 21 is pivotally mounted on the bottom wall 111 via a hinge axle 25. The abrader 20 is a reciprocating abrasion test piece. The first sensor members 22 are used to monitor frictional forces between the abrader 20 and the specimen 3 during an abrasion test. The second sensor member 23 is for monitoring the normal force during the abrasion test. In this embodiment, the first and second sensor members 22, 23 are piezoelectric sensors. However, this is not a limitation of the disclosure. In other embodiments, the first and second sensor members 22, 23 may be other types of force sensors. In this embodiment, the adjustment members 24 are threaded rods. The adjustment members 24 are movable toward the abrader fixture 21 to tightly abut against the abrader fixture 21. The two adjustment members 24 respectively abut against two opposite sides of the abrader fixture 21 to preload the abrader fixture 21. The preloading of the abrader fixture 21 enables backlash between the abrader fixture 21 and the adjustment members 24 to be reduced or cancelled. Furthermore, the adjustment members 24 are respectively threadedly connected to the first sensor members 22, so as to allow the force received from the abrader fixture 21 to be effectively transmitted to the corresponding first sensor member 22 via the adjustment members 24. This helps to increase the accuracy of the reciprocating friction and wear test apparatus 10.

Figure 6:
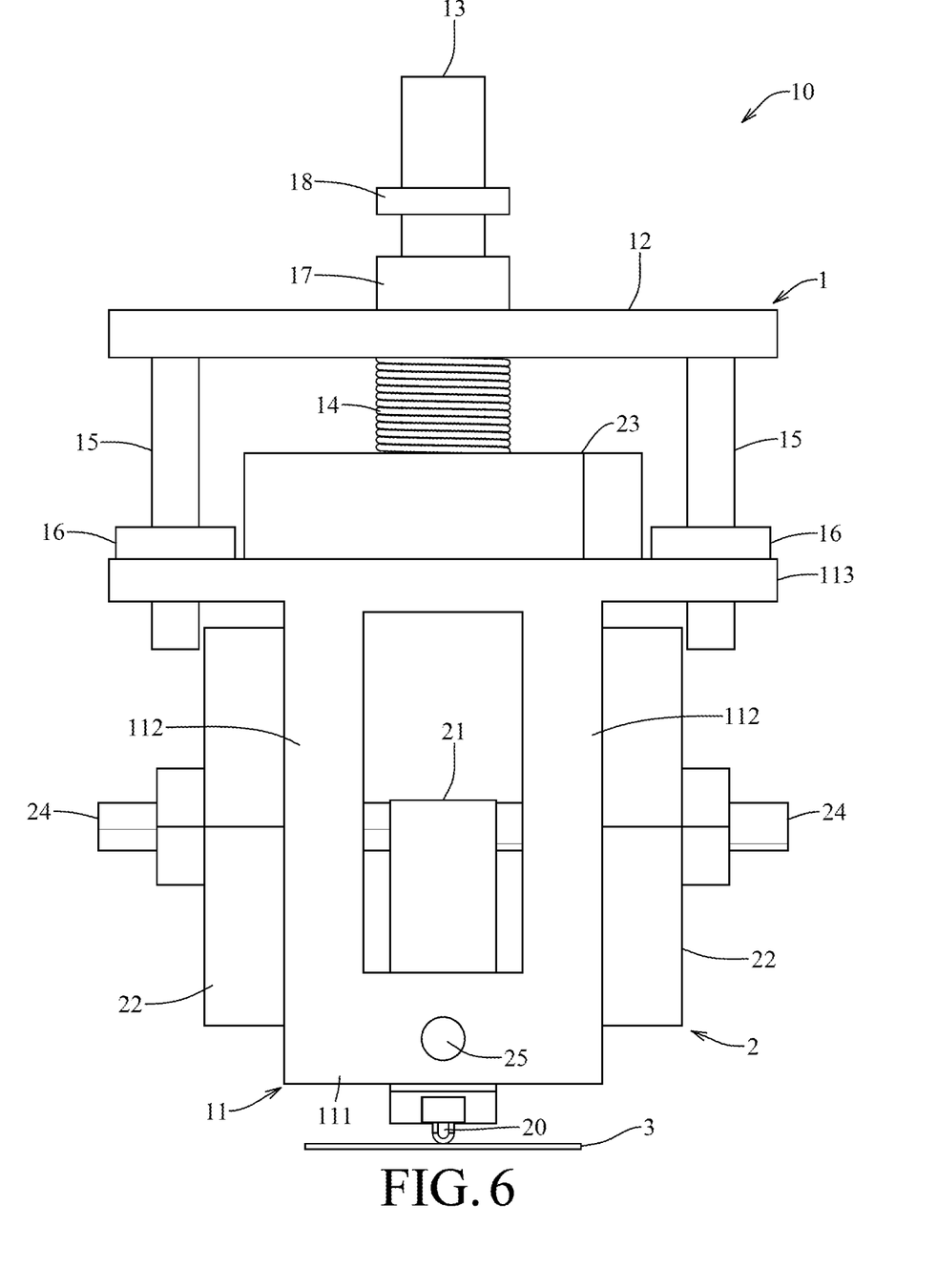
FIG. 6 is a front view of the first embodiment, showing an abrader abrading the specimen, and a resilient member under compression.
Figure 7:
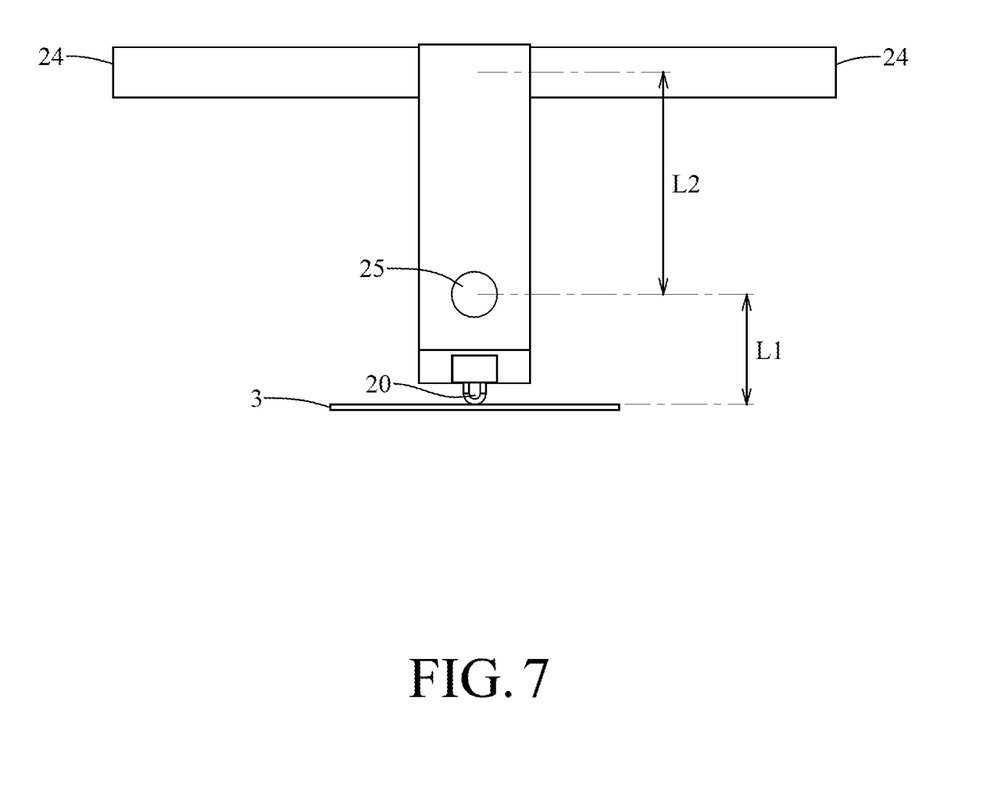
FIG. 7 is a fragmentary schematic front view of the first embodiment, showing distance relationships between a pivot axle and adjustment members, and the pivot axle and the specimen.
Figure 8:
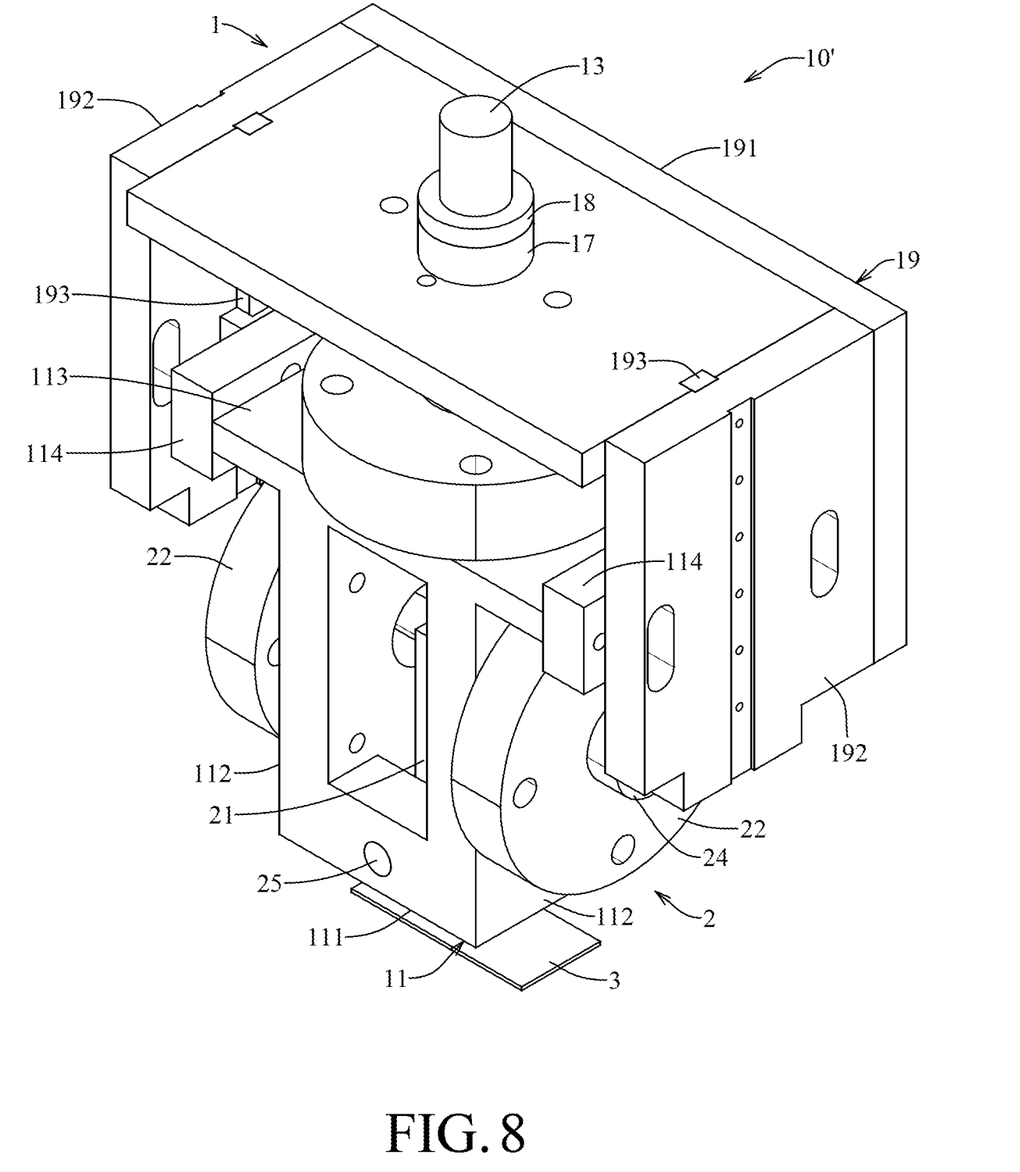
FIG. 8 is a perspective view illustrating a second embodiment of the reciprocating friction and wear test apparatus according to the present disclosure.
Figure 9:
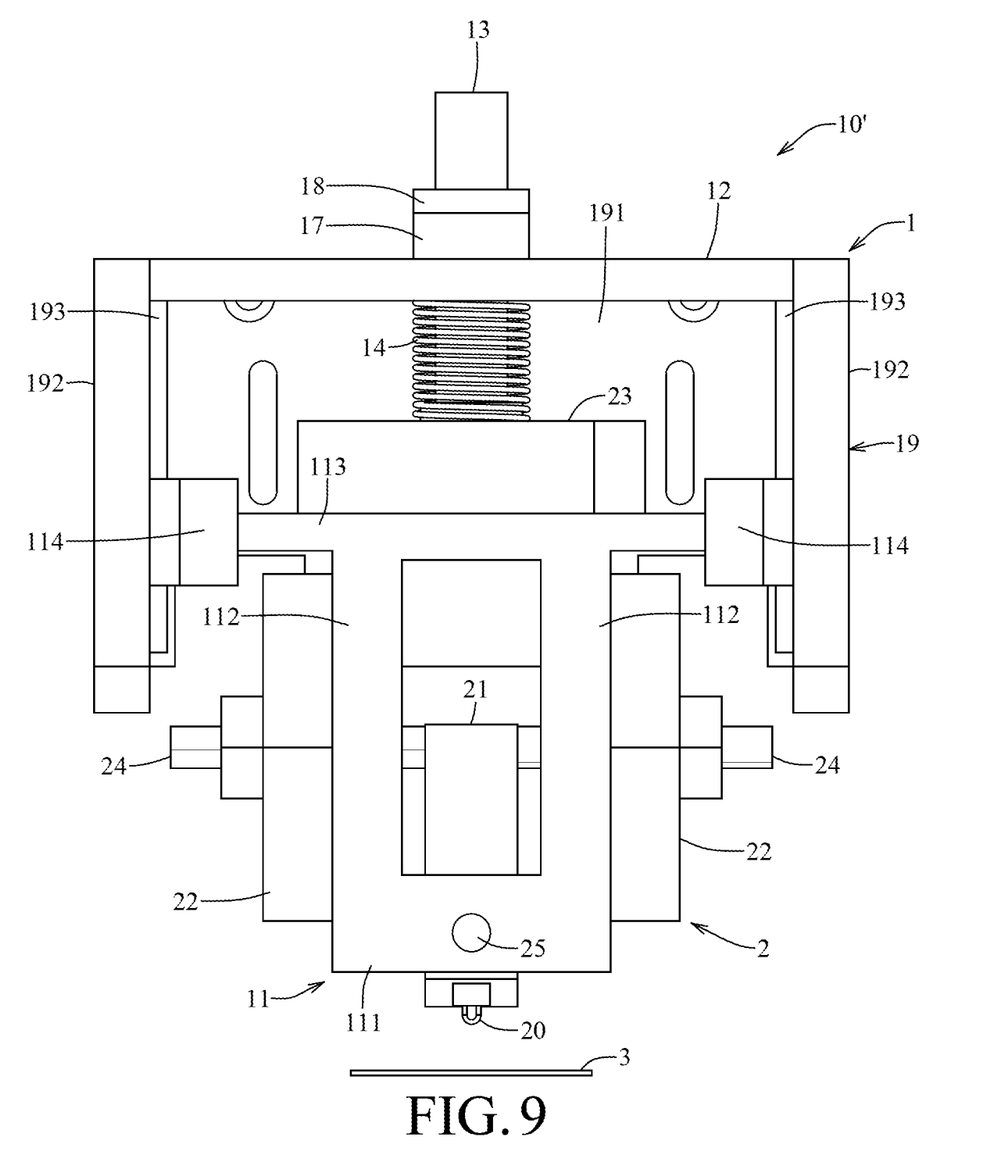
FIG. 9 is a front view of the second embodiment.
Figure 10:
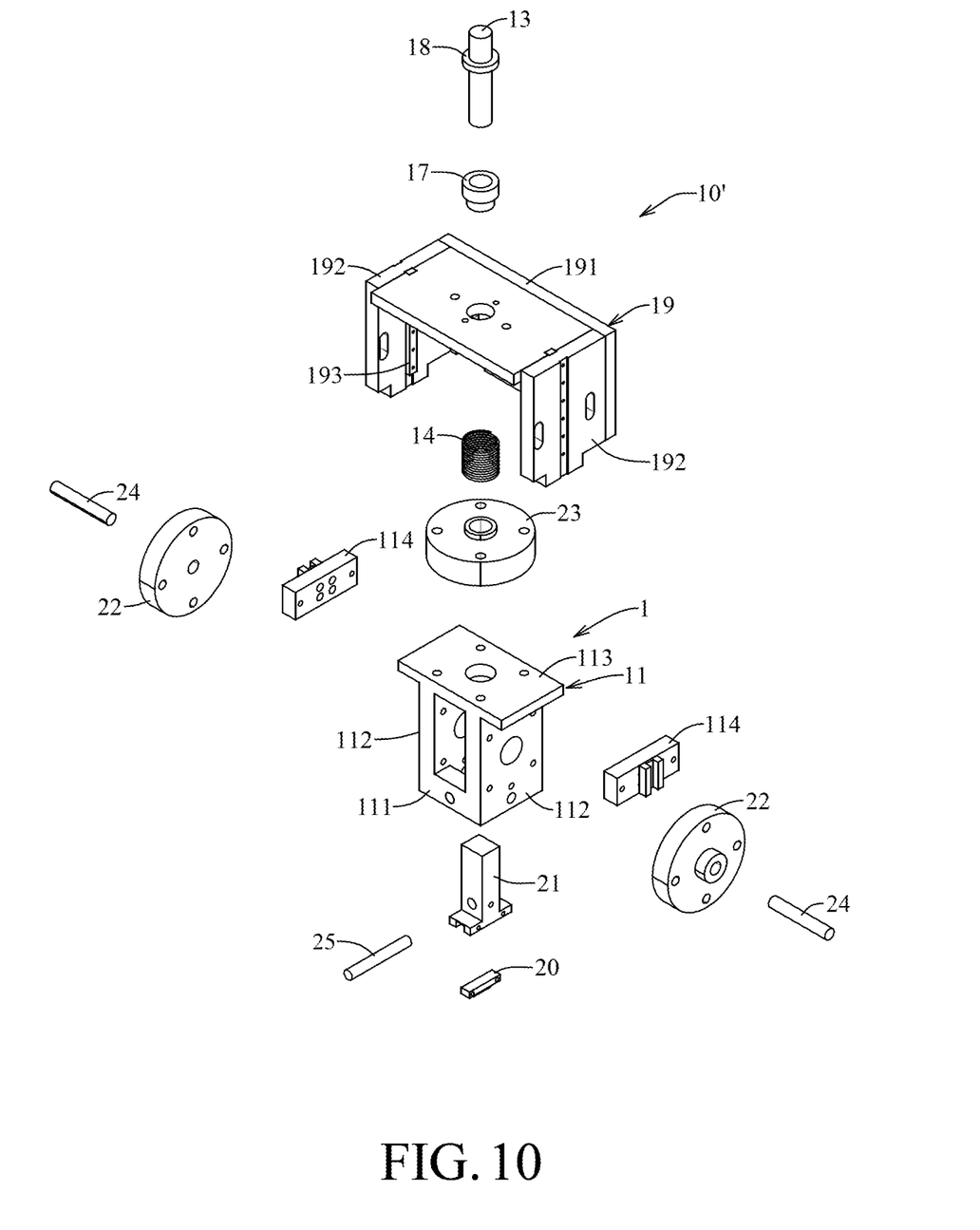
FIG. 10 is an exploded perspective view showing the second embodiment.
Figure 11:
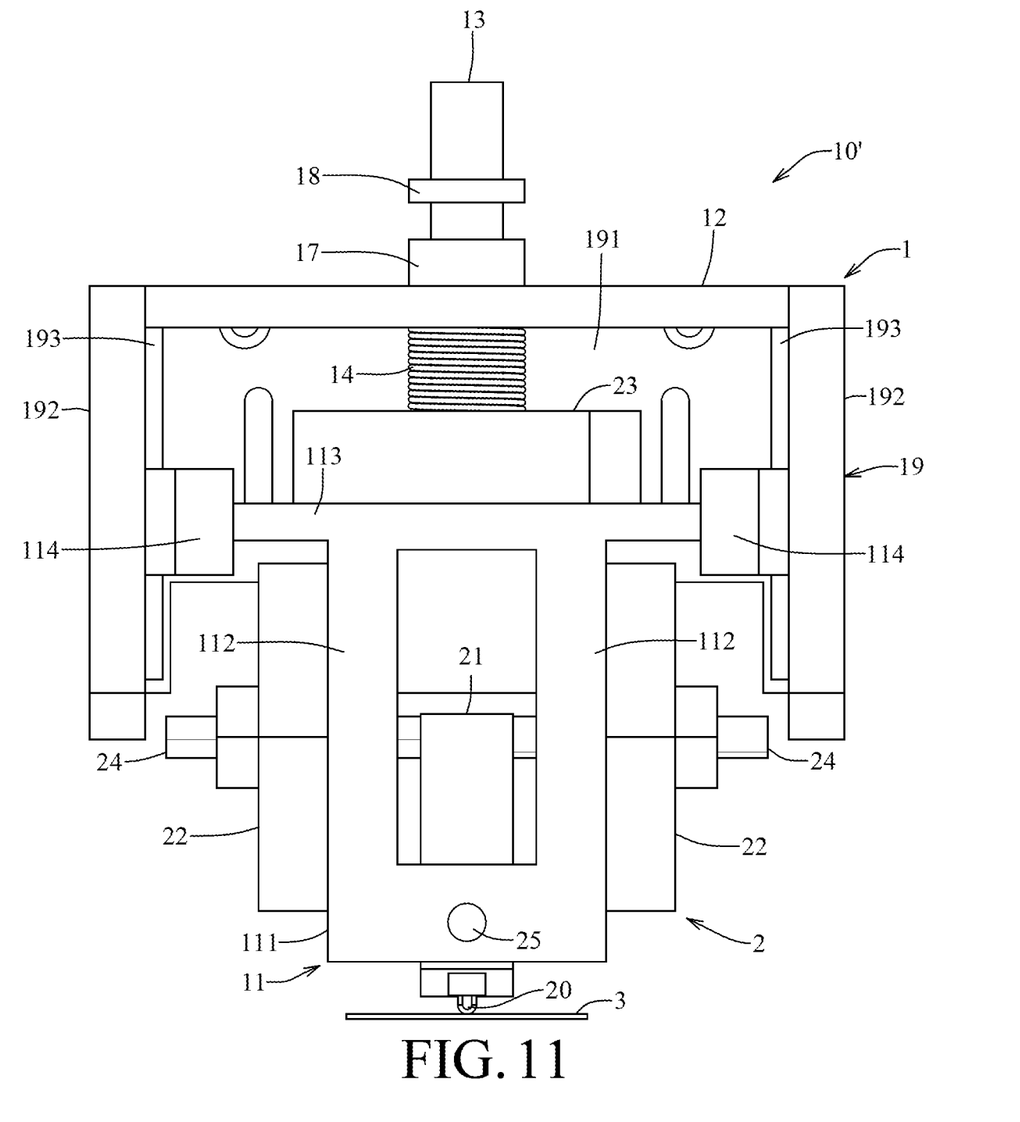
FIG. 11 is a front view of the second embodiment, showing the abrader abrading the specimen and the resilient member under compression.

Referring to FIGS. 6 and 7, during wear testing, the abrader affixed to the abrader fixture 21 moves horizontally and reciprocally as shown in FIG. 1, while abrading the specimen 3 and generating a torque force. The abutment of the adjustment members 24 against the abrader fixture 21 preloads the abrader fixture 21 and allows the calibration of the preload before the abrasion test. The reciprocating friction and wear test apparatus 10 may be calibrated before testing by subtracting the preload from the corresponding first sensor member 22, and the friction force between the specimen and the abrader 20 may be derived using different torque length ratios of the hinge axle 25. For example, in this embodiment, the hinge axle 25 is located a vertical distance (L1) away from the contact point between the specimen 3 and the abrader 20, and is located a vertical distance (L2) away from a center height of the adjustment member 24. A ratio of the vertical distance (L1) to the vertical distance (L2) is 1:2. Since the abrader fixture 21 is configured to maintain rotational balance, the product of a friction force and the vertical distance (L1) will be equal to the product of the force detected by the first sensor members 22 (minus any preload) and the vertical distance (L2). Therefore, the value of the friction force will be double the magnitude of the value obtained by the first sensor members 22, and the friction between the abrader 20 and the specimen 3 may thus be calculated. When the abrader 20 abrades the specimen 3, the abrader fixture 21, the abrader 20 along with the frame 11, the second sensor member 23, and the guide post 13 are moved toward the base plate 12, so that the resilient member 14 is compressed and the second sensor member 23 can measure a force value. When it is desired to measure a normal force between the abrader 20 affixed to the abrader fixture 21 and the specimen 3, the second sensor member 23 is preloaded via compression of the resilient member 14, and the preload force may be subtracted from the force value measured by the second senor member 23. Additionally, since the resilient member 14 can absorb some of the impact during testing, accidental damage to the second senor member 23 can be avoided.

Referring to FIGS. 8 to 11, a second embodiment of a reciprocating friction and wear test apparatus 10 is shown. The second embodiment is similar to the first embodiment; however the second embodiment is different in that the guide rods 15 and the side bearings 16 illustrated in the previous embodiment are omitted, while including a rail unit 19. More specifically, in the second embodiment, the frame unit 1 further includes a rail unit 19 that is secured to the base plate 12, and the frame 11 is movably connected to the rail unit 19. The rail unit 19 has a rear wall 191 that is secured to the base plate 12, two lateral walls 192 that are secured to the base plate 12 and that are respectively connected to two opposite ends of the rear wall 191, and two rails 193 that are respectively mounted on the lateral walls 192. In this embodiment, the frame 11 further has two sliding blocks 114 that are respectively immovably connected to two opposite ends of the top wall 113, and that are respectively slidably mounted on the rails 193. During abrasion testing, the abrader fixture 21 along with the frame 11, and the second sensor member 23 and the guide post 13 are able to move toward the base plate 12 along the rails 193 of the rail unit 19. In this way, the resilient member 14 may be compressed so that the normal force between the abrader fixture 21 and the specimen 3 may be measured. In the second embodiment, the first and second sensor members 22, 23 are piezoelectric sensors.

In summary of the above, in the reciprocating friction and wear test apparatus 10 according to the present disclosure, by virtue of the adjustment members 24 being movable toward the abrader fixture 21 to tightly abut against the abrader fixture 21, and be respectively threadedly connected to the first sensor members 22, backlash between the first sensor members 22 and the abrader fixture 21 may be cancelled, and forces from the abrader fixture 21 may be effectively transmitted to the first sensor members 22 through the adjustment members 24. The reciprocating friction and wear test apparatus may thus have increased accuracy and decreased backlash.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A reciprocating friction and wear test apparatus comprising:
   a frame unit including
   a frame that has a bottom wall formed with an opening, and two side walls extending upwardly from said bottom wall; and
   an abrader unit including an abrader fixture that extends through said opening and that is pivotable relative to said bottom wall, an abrader that is affixed to said abrader fixture, two first sensor members that are respectively mounted to said side walls and that monitor frictional forces between said abrader and a specimen, and two adjustment members that are respectively connected to said first sensor members and that extend respectively through said first sensor members, said two adjustment members extending respectively through said side walls, said two adjustment members being movable toward said abrader fixture to tightly abut against said abrader fixture;
   wherein said frame unit further includes a base plate that is connected to said frame, said frame being configured to move in a reciprocating motion relative to said base plate, said abrader unit further including a second sensor member that is mounted between said base plate and said frame
   wherein said frame further has a top wall that is connected to distal ends of said side walls opposite to said bottom wall;
   wherein said second sensor member is immovably mounted on said top wall; and
   wherein said frame unit further includes a guide post that movably extends through said base plate, and that is connected to said second sensor member, and a resilient member that is sleeved on said guide post, and that has two opposite ends respectively abutting against said base plate and said second sensor member.

2. The reciprocating friction and wear test apparatus as claimed in claim 1, wherein said frame unit further includes two guiding rods that are immovably connected to said base plate, and that extend through said top wall of said frame, said frame being movable in a reciprocal motion along said guiding rods relative to said base plate.

3. The reciprocating friction and wear test apparatus as claimed in claim 1, wherein the frame unit further includes an upper bearing that is mounted on said base plate, said guide post extending through said upper bearing, said frame unit further includes a securing ring co-movably sleeved on said guide post, and abutting removably against said upper bearing.

4. The reciprocating friction and wear test apparatus as claimed in claim 1, wherein the frame unit further includes a rail unit that is secured to said base plate, said frame being movably connected to said rail unit.

5. The reciprocating friction and wear test apparatus as claimed in claim 4, wherein said rail unit has a rear wall that is secured to said base plate, two lateral walls that are secured to said base plate and that are respectively connected to two opposite ends of said rear wall, and two rails that are respectively mounted on said lateral walls, said frame further having two sliding blocks that are respectively immovably connected to two opposite ends of said top wall, and that are respectively slidably mounted on said rails.

6. The reciprocating friction and wear test apparatus as claimed in claim 5, wherein the first and second sensor members are piezoelectric sensors.

7. The reciprocating friction and wear test apparatus as claimed in claim 1, wherein the first and second sensor members are piezoelectric sensors.

* * * * *